United States Patent [19]
Ihara

[11] Patent Number: 5,351,372
[45] Date of Patent: Oct. 4, 1994

[54] DETACHABLE END METAL FITTING USED FOR CARGO FASTENING BELT

[75] Inventor: Ryoseki Ihara, Aichi, Japan

[73] Assignee: Kabushiki Kaisha Ihara Kogyo, Aichi, Japan

[21] Appl. No.: 974,501

[22] Filed: Nov. 12, 1992

[30] Foreign Application Priority Data

Nov. 12, 1991 [JP] Japan .................. 3-325249
Aug. 7, 1992 [JP] Japan .................. 4-061442[U]

[51] Int. Cl.⁵ .................................. A44B 11/00
[52] U.S. Cl. ................... 24/611; 24/68 CD; 24/634; 410/105
[58] Field of Search ............ 24/611, 609, 604, 598.9, 24/590, 686, 68 CD, 71.2, 265 CD, 170, 634, 905, 19, 115 L, 68 E; 410/110, 105, 108, 112, 115, 116; 294/75

[56] References Cited

U.S. PATENT DOCUMENTS

| | | | |
|---|---|---|---|
| 637,138 | 11/1899 | Lynne | 24/905 |
| 1,266,390 | 5/1918 | Blansett | 24/598.9 |
| 2,735,377 | 2/1956 | Elsner | 410/105 |
| 2,863,200 | 12/1958 | Miller et al. | 24/634 |
| 3,610,674 | 10/1971 | Janssen | 294/75 |
| 3,686,715 | 8/1972 | Brodnicki | 24/68 CD |
| 3,861,007 | 1/1975 | Silverman | 24/905 |
| 3,905,148 | 9/1975 | Naone et al. | 24/634 |
| 4,040,602 | 8/1977 | Foster, Sr. | 24/68 CD |
| 4,174,119 | 11/1979 | Biles | 24/68 CD |
| 4,389,059 | 6/1983 | Stephenson | 24/115 L |
| 4,564,981 | 1/1986 | Knox | 24/68 E |
| 4,796,336 | 1/1989 | Scully | 24/68 CD |

FOREIGN PATENT DOCUMENTS 0247175 5/1966 Australia .............. 24/573.1

Primary Examiner—Victor N. Sakran
Attorney, Agent, or Firm—Wenderoth, Lind & Ponack

[57] ABSTRACT

A cargo fastening belt is provided with a detachable end metal fitting so that different types of end metal fittings can be provided for a single type of cargo fastening belt. A rail engaging metal fitting that is attached to one end of a cargo fastening belt is adapted to be detachably engaged with a slot in a rial for fastening cargo. The detachable end metal fitting is thus detachably attached to the rail engaging metal fitting by the provision of a slot in a metal fitting main body for connection with the rail engaging metal fitting. Alternatively, the cargo fastening belt may have a ring portion at one end thereof, and the detachable end metal fitting may be detachably attached to the ring portion. The detachable end metal fitting then has an engaging body for engaging a mating member when fastening cargo, a shackle with opposite side plate portions mounted on a proximal end portion of the engaging body and a supporting shaft extending through the ring portion of the cargo fastening belt supported by the opposite side plate portions of the shackle. Preferably, the supporting shaft comprises a bolt that extends through and between the side plate portions, the bolt being secured by a nut at one end thereof.

8 Claims, 16 Drawing Sheets

5,351,372

DETACHABLE END METAL FITTING USED FOR CARGO FASTENING BELT

FIELD OF THE INVENTION

The present invention relates to a detachable end metal fitting that is detachably attached to a rail engaging-type metal fitting attached to an end of a belt main body, or a ring portion formed at an end of the belt main body.

PRIOR ART

In using a cargo fastening belt, an end metal fitting of a predetermined configuration is attached to one end of the belt main body, while the other end thereof is connected to a cargo fastening machine. There are end metal fittings of various configurations which are determined by the of members to be engaged, i.e. mating members with which the end metal fittings are brought into engagement. Taking the configuration of a hook-shaped end metal fitting, for example, there are available a normal hooked metal fitting in which a rod member is curved like a fishhook, a flat hooked metal fitting in which a sheet member is curved in such a manner to form a fishhook-like cross-section and so forth. In addition, in a case where a body to be engaged, i.e. a mating member has a hooked configuration, end metal fittings that are attached to the ends of the belt main body will be configured like an endless link.

Due to this, belt makers produce cargo fastening belts having end metal fittings of different configurations attached at one end thereof, and forwarding companies are required to carry cargo fastening belts of various types which are only different in the configuration of their end metal fittings so as to meet the configurations of hooking portions (members to be engaged) provided on the rear body of a truck at which the end metal fittings are hooked so that cargo of various configurations are securely fastened.

In end metal fittings that are attached to one end of a belt main body, on top of the end metal fittings of hooked and endless link types, there is also an end metal fitting of a rail engaging-type which is brought into engagement with a slot to be engaged formed in a rail to be engaged horizontally mounted on the inside of a side plate of a container of a container car or a side plate of the rear body of a truck.

Next, with reference to FIG. 3 and FIGS. 9 to 12, a cargo fastening belt will be described which is constructed so that an end metal fitting A of a rail engaging type is attached to one end of a belt main body 1.

This end metal fitting of a rail engaging type is constructed so that an engaging lever 3 is disposed in the interior of a metal fitting main body 2 formed by curving a metal plate so as to form a substantially U-shaped cross-section. Both members are pivotally secured to each other by means of a pin 4, and a compression spring 5 is interposed between the bottom of the metal fitting main body 2 and the engaging lever 3. An operating portion 6 of the engaging lever 3 is biased toward the bottom of the metal fitting main body 2 by virtue of the restoring force of the compression spring 5.

Engaging grooves 2a and 2b are formed in the end faces of the metal fitting main body 2, respectively, and an engaging stepped portion 3a is formed on the lower portion of the operating portion 6 of the engaging lever 3. The belt main body 1 is passed through a belt putting-through slot 7 formed in the metal fitting main body 2, and the metal fitting A of a rail engaging type is attached to one end of this belt main body 1.

As shown in FIG. 10, a number of slots 8 to be engaged are formed at predetermined intervals in a longitudinal direction in a rail R to be engaged. As shown in FIG. 9, for example, a plurality of rails R to be engaged of this type are mounted horizontally on the inside of a side plate 12 of a container 11 of a container car at predetermined intervals along the vertical direction of the side panel. The length $L_1$ between the bottom of the deeper engaging groove 2a and the end face of the metal fitting main body 2, of the other engaging groove 2b is shorter than the length $L_2$ of the slot 8 to be engaged, formed on the rail R to be engaged. As shown in FIG. 11, therefore, the metal fitting main body 2 is inclined in such a manner that the portion of the rail R that faces the slot 8 fits in the engaging groove 2a. While maintaining this state, the side of the metal fitting main body 2 where the engaging groove 2b is formed is inserted into the slot 8 so as to allow the other part of the rail R facing the slot 8 to fit in the engaging groove 2b that is formed in the relevant side of the metal fitting main body 2. The engaging stepped portion 3a of the engaging lever 3 is brought into engagement with the portion of the rail R that faces the slot 8 by virtue of the restoring force of the compressing spring 5. The metal fitting A is thereby in turn brought into engagement with the slot 8 of the rail R, as shown in FIGS. 10 and 12.

In addition, in order to release the engagement between the slot 8 and the metal fitting A from an engaged state as shown in FIG. 12, after the operating portion 6 of the engaging lever 3 is lifted using the tip of the finger so as to disengage the engaging lever from the slot 8, the whole of the metal fitting A is moved toward the left as viewed in the drawing. Then the right end portion of the metal fitting A of a rail engaging type is withdrawn from the slot 8 to be engaged. Although vertical slots 8 to be engaged are formed in the illustrated rail R, transverse slots may be formed in the same same rail.

In order to fasten cargoes 13 loaded in the container 11 using a cargo fastening belt V of this type, as shown in FIG. 9, the metal fitting A of a rail engaging type attached to one end of the belt main body 1 is brought into engagement with a slot 8 of the rail R.

This cargo fastening belt in which the metal fitting of a rail engaging type is attached to one end of the belt main body is used so frequently that most forwarding companies carry cargo fastening belts of this type.

In cargo fastening belts, in addition to the above-mentioned fastening belt in which the metal fitting of a rail engaging type is attached to one end of the belt main body, there is another type of fastening belt in which a ring portion is provided at one end of the belt main body for integrally attaching an end metal fitting thereto.

SUMMARY OF THE INVENTION

A first object of the present invention is to obviate the necessity of carrying cargo fastening belts of various types that are different from each other only because of different end metal fittings attached thereto by detachably attaching end metal fittings of various configurations to a metal fitting of a rail engaging type attached to one end of the belt main body of a cargo fastening belt, and using in common such a metal-fitting-attached cargo fastening belt.

In addition, a second object of the present invention is to obviate the necessity of carrying cargo fastening belts of various types that are different from each other only because of different end metal fittings attached thereto by making it possible to detachably attach end metal fittings of various types to a ring portion at one end of a normal belt main body.

A first embodiment of the present invention is characterized by a detachable end metal fitting detachably attached to a metal fitting of a rail engaging type at one end of a cargo fastening belt. The metal fitting of a rail engaging type is attached to one end of a belt main body, the metal fitting of a rail engaging type being constructed so as to be detachably brought into engagement with a slot to be engaged in a rail. An engaging body is integrally provided on a metal fitting main body for hook engaging a body to be engaged, i.e. a mating member when fastening cargoes, and a slot to be engaged is formed in the metal fitting main body with which the metal fitting of a rail engaging type is detachably brought into engagement.

When the metal fitting of a rail engaging type, attached to one end of the belt main body, is brought into engagement with the slots to be engaged formed in the end metal fittings of various configurations, the end metal fittings of the various configurations are mounted at the one end of the belt main body via the metal fitting of rail engaging type. Thus, the cargo fastening belt can be brought into engagement with a part other than the rail to be engaged at one end thereof by means of this detachable end metal fitting.

In addition, a second embodiment of the present invention is characterized by an end metal fitting detachably attached to a ring portion provided at one end of a belt main body. A shackle is attached to a proximal end portion of an engaging body that is brought into hook engagement with a body to be engaged, i.e. a mating member when cargoes are fastened. A supporting shaft is put through the ring portion of the belt main body to thereby be supported by respective side plate portions of the shackle.

In the construction of the end metal fitting according to the second embodiment in which the shackle is attached to the proximal end portion of the engaging body, when the supporting shaft is put through the ring portion of the belt main body so as to be supported by means of the side plate portions of the shackle, the end metal fitting is mounted at the end of the belt main body. Moreover, the end metal fitting can be removed from the belt main body only by removing the supporting shaft from the respective side plate portions of the shackle.

In either of the first and second embodiments, it is possible to use a belts belt main body in common to obtain the same effect as one obtained when carrying cargo fastening belt of various types having end metal fittings of different configurations only by carrying detachable end metal fittings of various configurations.

DETAILED DESCRIPTION OF THE PREFERRED EMBODIMENT

Figure 1:
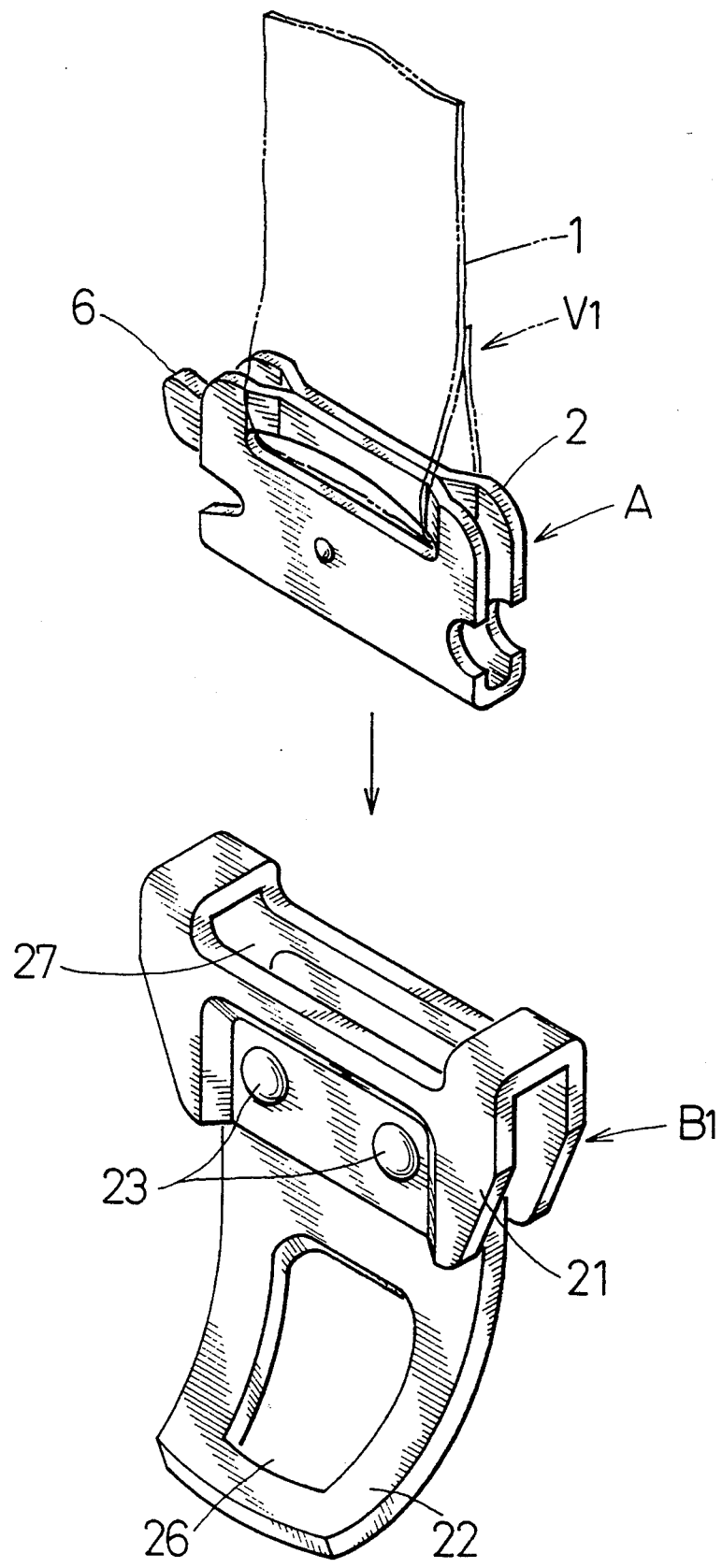
FIG. 1 is a perspective view of a detachable end metal fitting $B_1$ according to a first embodiment of the invention.
Figure 2:
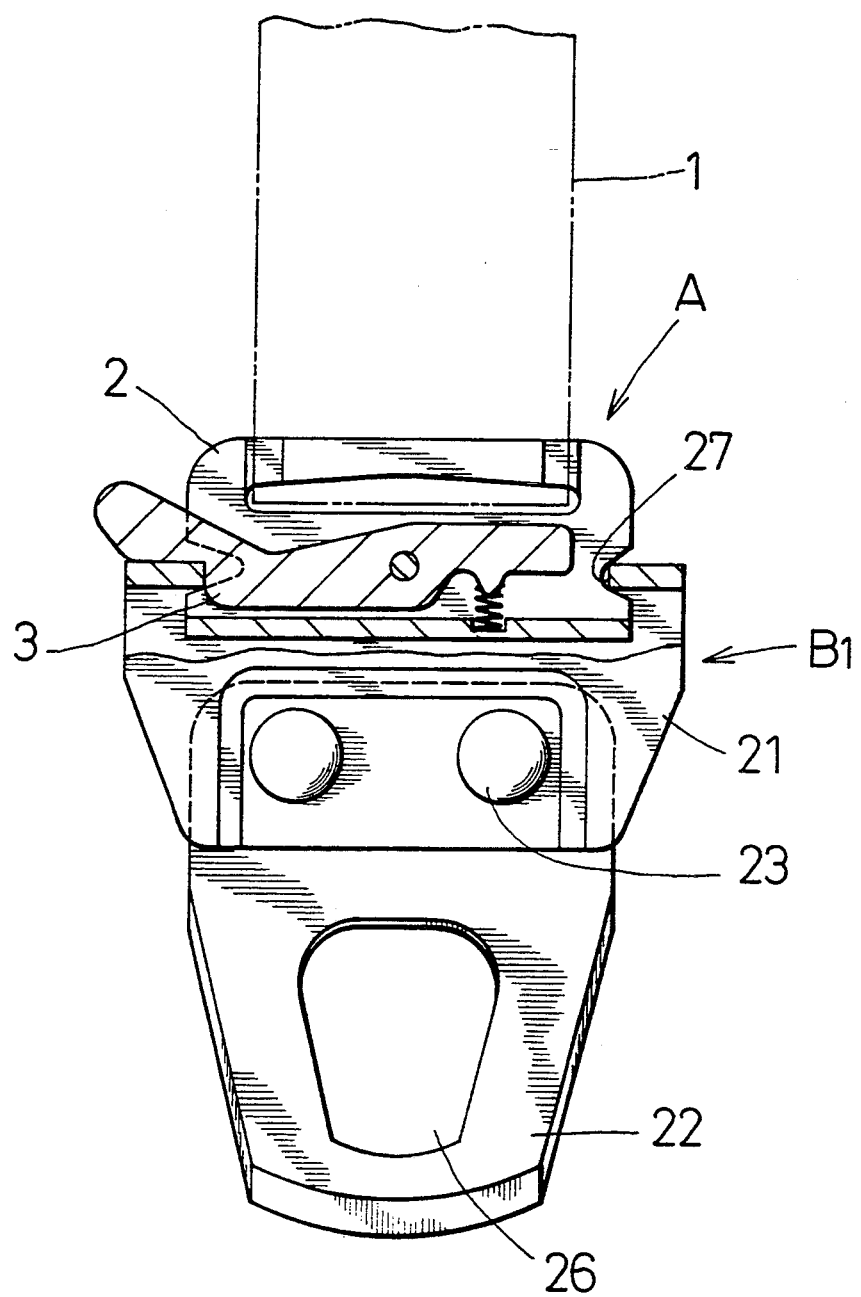
FIG. 2 is a front view of the same.
Figure 3:
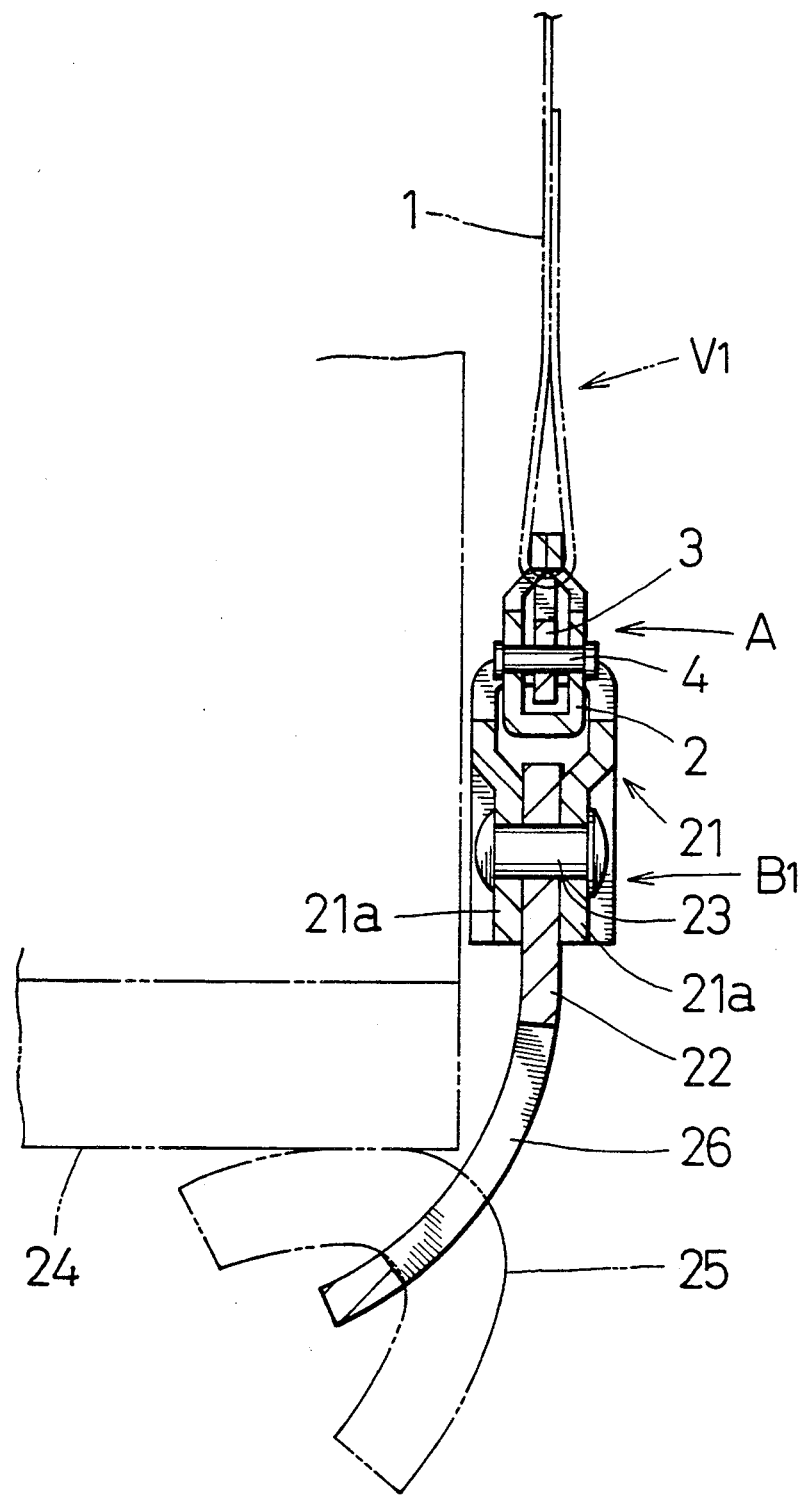
FIG. 3 is a central longitudinal cross-sectional view of the same.

A detachable end metal fitting $B_1$ according to a first embodiment will be described first. As shown in FIGS. 1 to 3, a metal fitting main body 21 of this end metal fitting $B_1$ is formed into an inverted U-shape by curving a thick metal plate having a square opening at the central portion thereof. The upper end portion of an engaging plate 22 is held between facing side plate portions of the metal fitting main body 21 and are integrally secured to the latter by means of a pair of rivets 23. This engaging plate 22 is a member that is brought into engagement with a hook 25 fixed by welding to the lower side portion of the rear body 24 of a truck, and the plate is curved when viewed from the side thereof and provided with an engaging slot 26 at the central portion thereof. Since the metal fitting main body 21 is formed into an inverted U-shape by curving a thick metal plate having a square opening at the central portion thereof, it has an opening formed in the central portion at the upper end portion thereof, this opening constituting a slot 27 fulfilling the same function as that of the slot 8 of the rail R to be engaged. Therefore, when the metal fitting A of a rail engaging type, attached to one end of the cargo fastening belt $V_1$, is brought into engagement with the slot 27, formed at the upper end portion of the metal fitting main body 21, by conducting the same operation as mentioned above, as shown in FIGS. 1 to 3, the end metal fitting $B_1$ is then attached to the metal fitting A.

Figure 4:
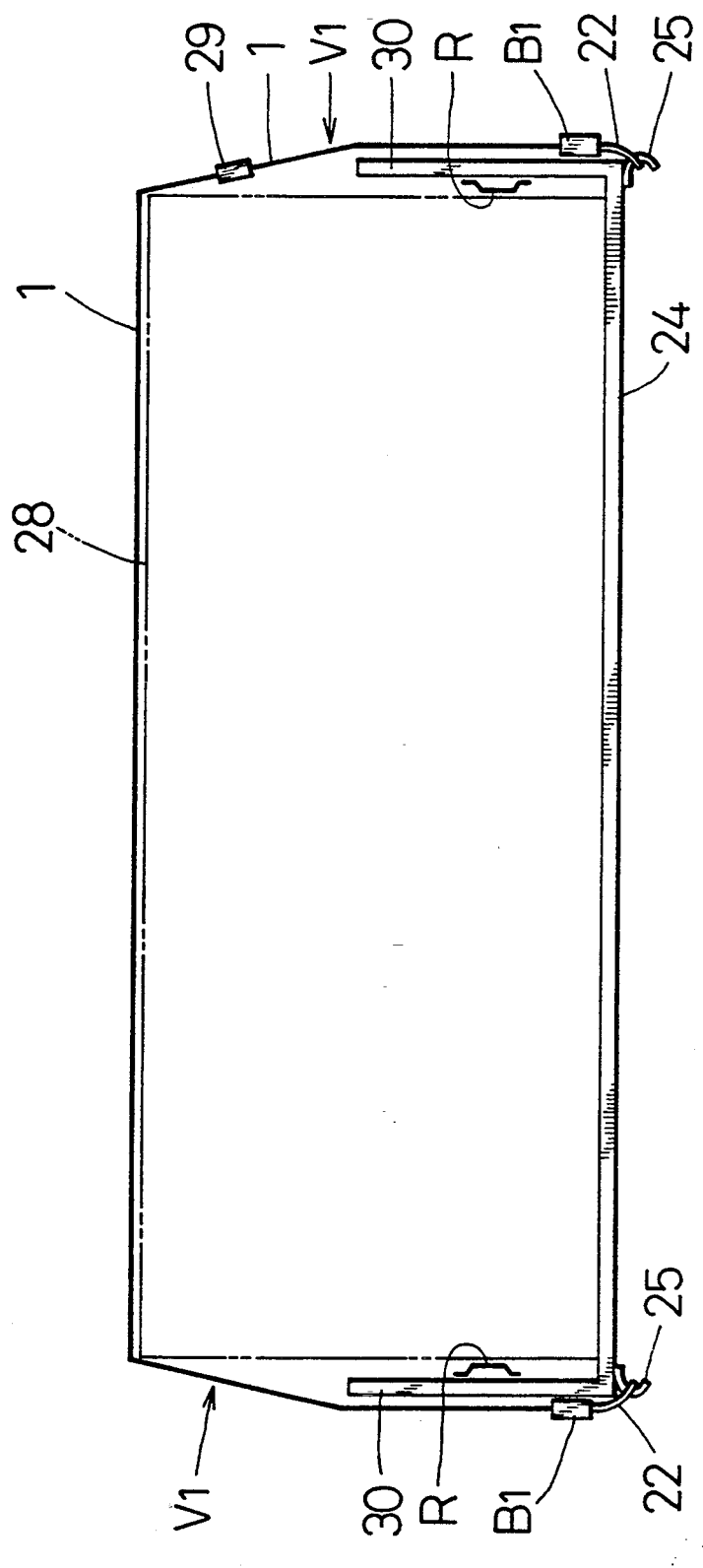
FIG. 4 is a drawing showing a state in which cargoes are fastened by using a cargo fastening belt $V_1$ having the detachable end metal fitting $B_1$ attached to one end thereof.

FIG. 4 is a schematic diagram showing a state in which cargoes 28 loaded on the rear body 24 of a truck are fastened by the cargo fastening belt $V_1$ in which the end metal fitting $B_1$ is attached to one end of a belt main body 1 via the metal fitting A of a rail engaging type. Although rails R are mounted on the inside of side plates 30 of the rear body 24, since the cargoes 28 on the rear body 24 are too close to the rails R, it is not possible for the metal fittings A attached to one end of the cargo fastening belts $V_1$ to be brought into engagement with the rails R. Due to this, the end metal fittings $B_1$ attached to one end of the cargo fastening belts $V_1$ are hooked on hooks 25 fixed to the lower side portion of the rear body 24, and tension is imparted to the belt main body 1 by means of a cargo fastening machine 29 for fastening the cargoes 28.

Figure 5:
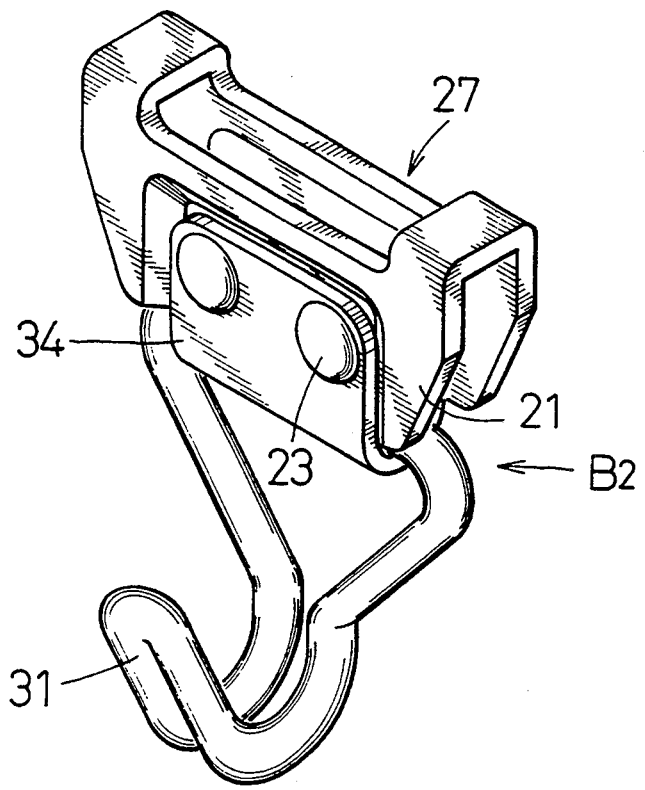
FIG. 5 is a perspective view of a detachable end metal fitting $B_2$ according to the invention.
Figure 6:
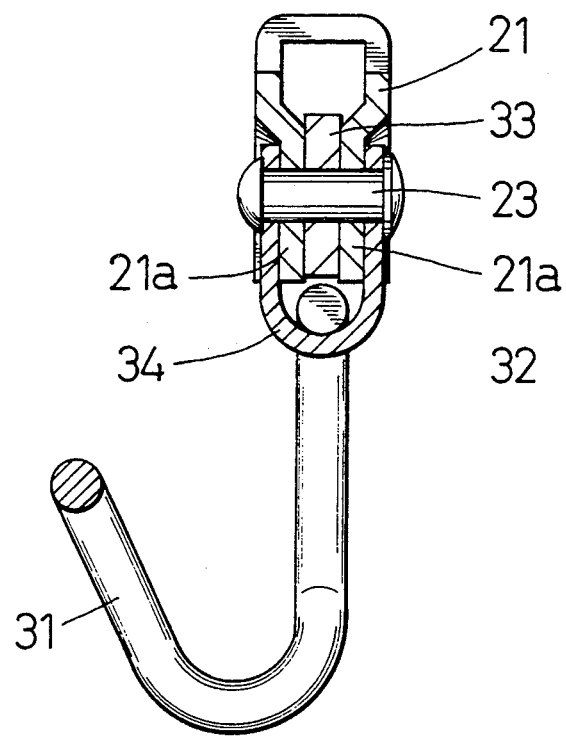
FIG. 6 is a cross-sectional view, showing the metal fitting of FIG. 7

An end metal fitting $B_2$ is shown in FIGS. 5 and 6. This end metal fitting $B_2$ is a hook-like member constructed by bending a rod member and curving like a hook a portion of the bent rod member rod where the constituent portions of the rod, become close to each other, thus forming a hook portion 31 where the constituent portions of the rod are separated from each other. The end portions of the rod member are curved inwardly relative to each other, forming supporting portions 32. A spacer 33 is interposed between respective plate portions 21a of the metal fitting main body 21, and a metal fitting supporting plate 34 of a U-shaped cross-section is applied to the outside of the respective plate portions 21a of the metal fitting main body 21, these three members being made integral with one another by the rivets 23. The supporting portions 32 of the end metal fitting $B_2$ are inserted into between the constituent portions of the metal fitting supporting member 34 for support. Thus, the hooked end metal fitting $B_2$ is rotated about the supporting portions 32 relative to the metal fitting main body 21.

Figure 7:
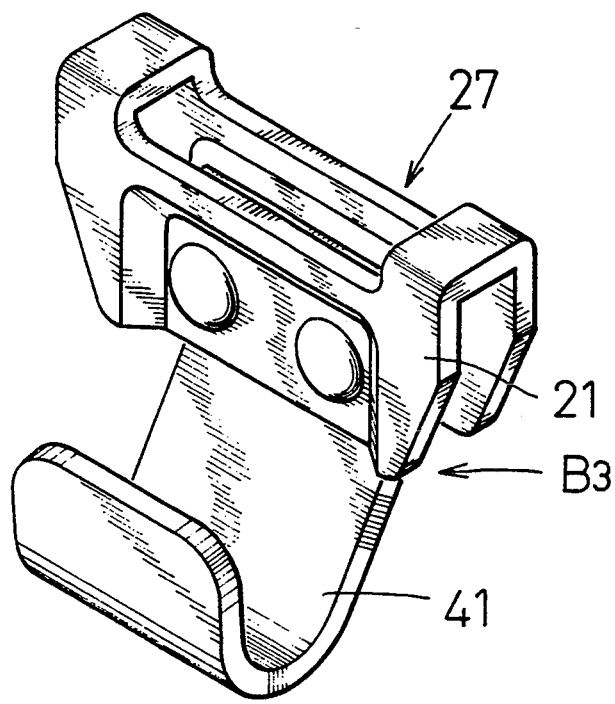
FIG. 7 is a perspective view of a detachable end metal fitting $B_3$ of the invention.
Figure 8:
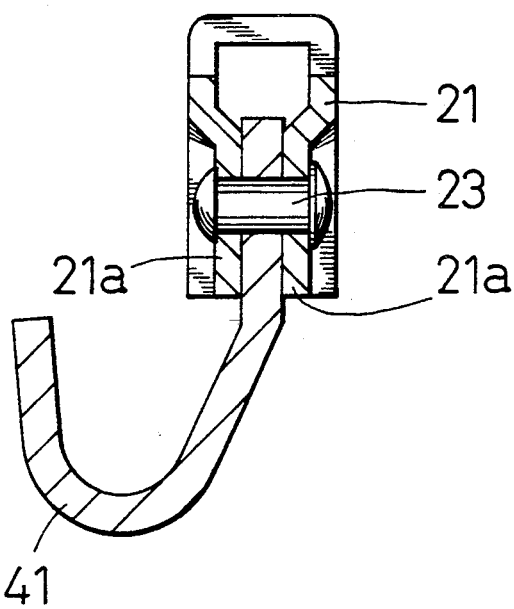
FIG. 8 is a cross-sectional view showing the end metal fitting of FIG. 7
Figure 9:
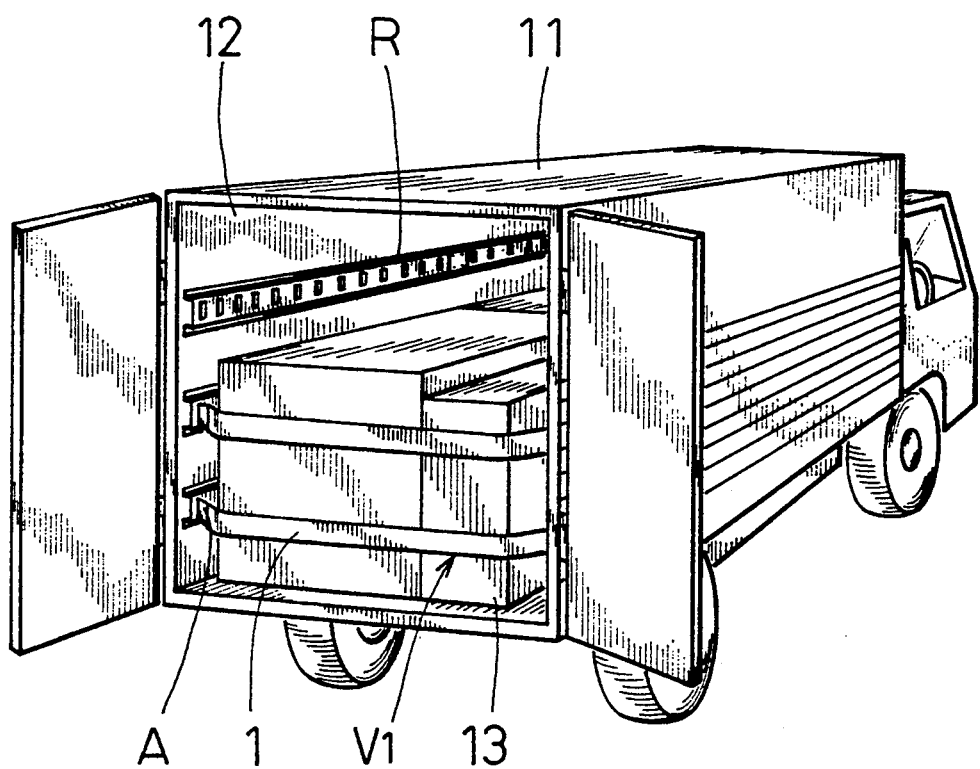
FIG. 9 is a perspective view showing a state in which cargoes are fastened by means of the cargo fastening belt having a metal fitting A of a rail engaging type attached to one end thereof.
Figure 10:
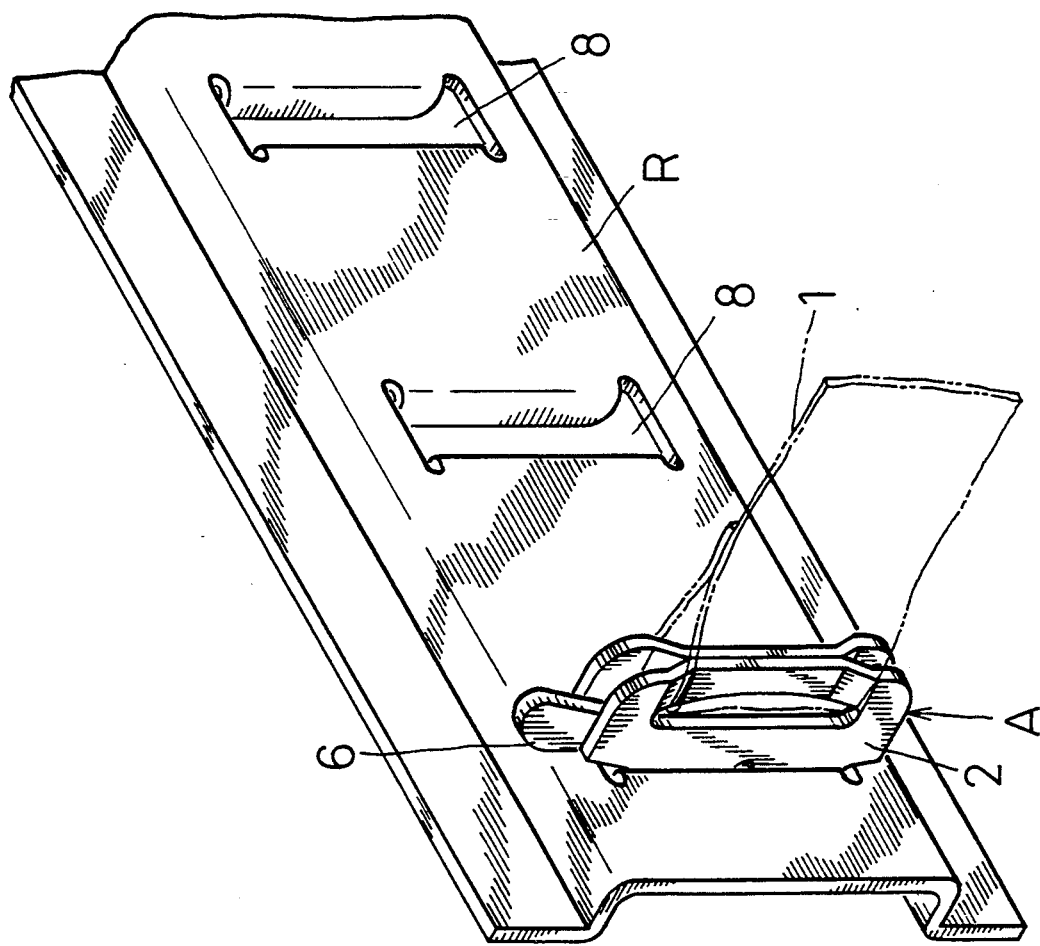
FIG. 10 is a perspective view showing a state in which the metal fitting A of a rail engaging type is in engagement with a slot 8 to be engaged of a rail R to be engaged
Figure 11:
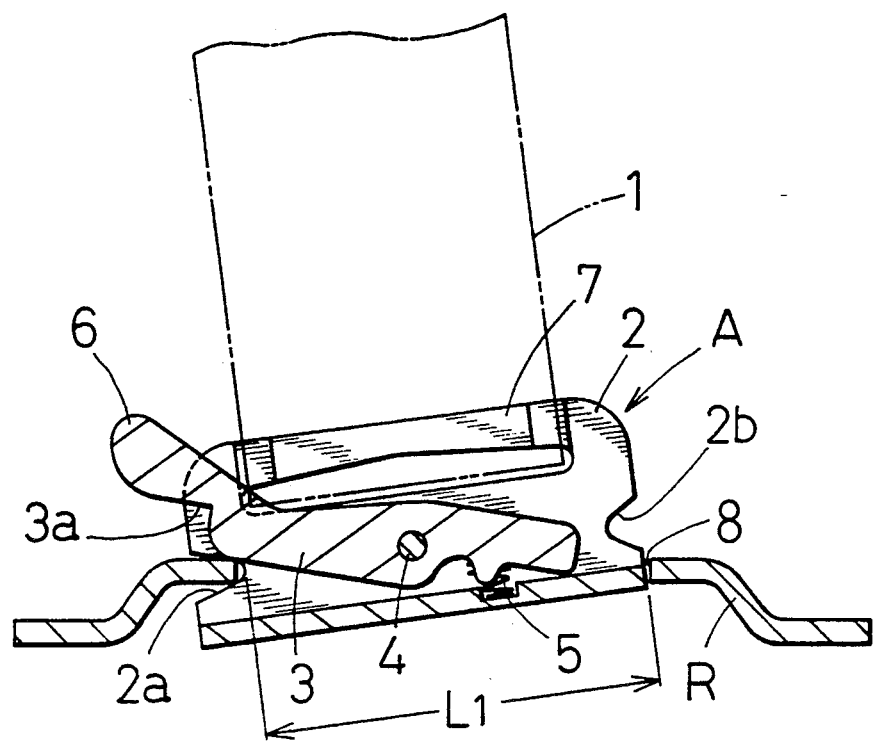
FIG. 11 is a cross-sectional view showing a state in which the metal fitting A of a rail engaging type is being brought into engagement with the slot 8 of the rail R.
Figure 12:
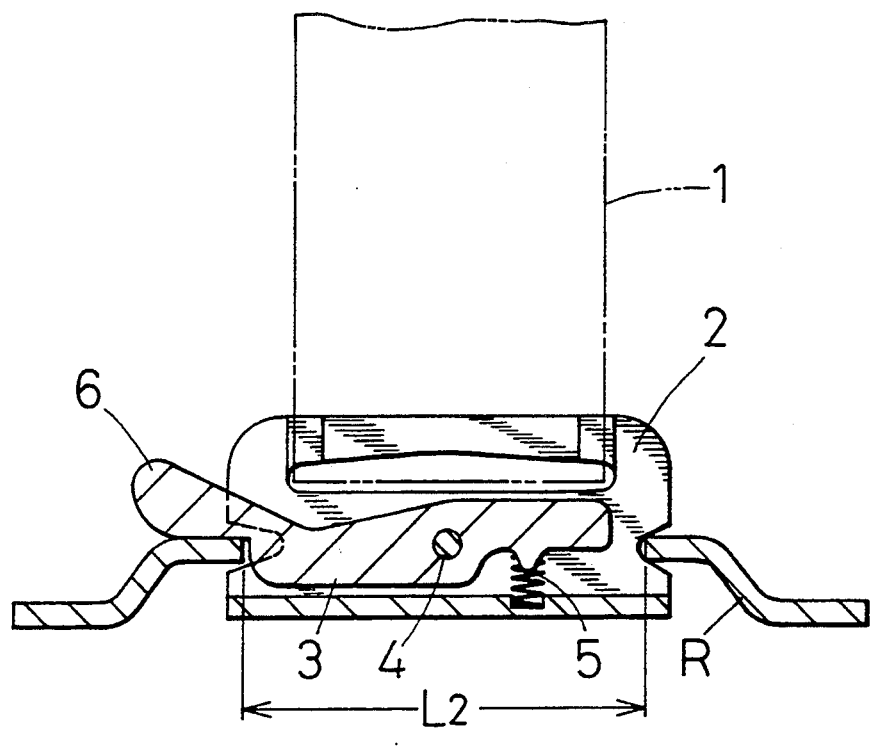
FIG. 12 is a cross-sectional view showing a state in which the metal fitting A of a rail engaging type is in engagement with the slot 8 of the rail R.
Figure 13:
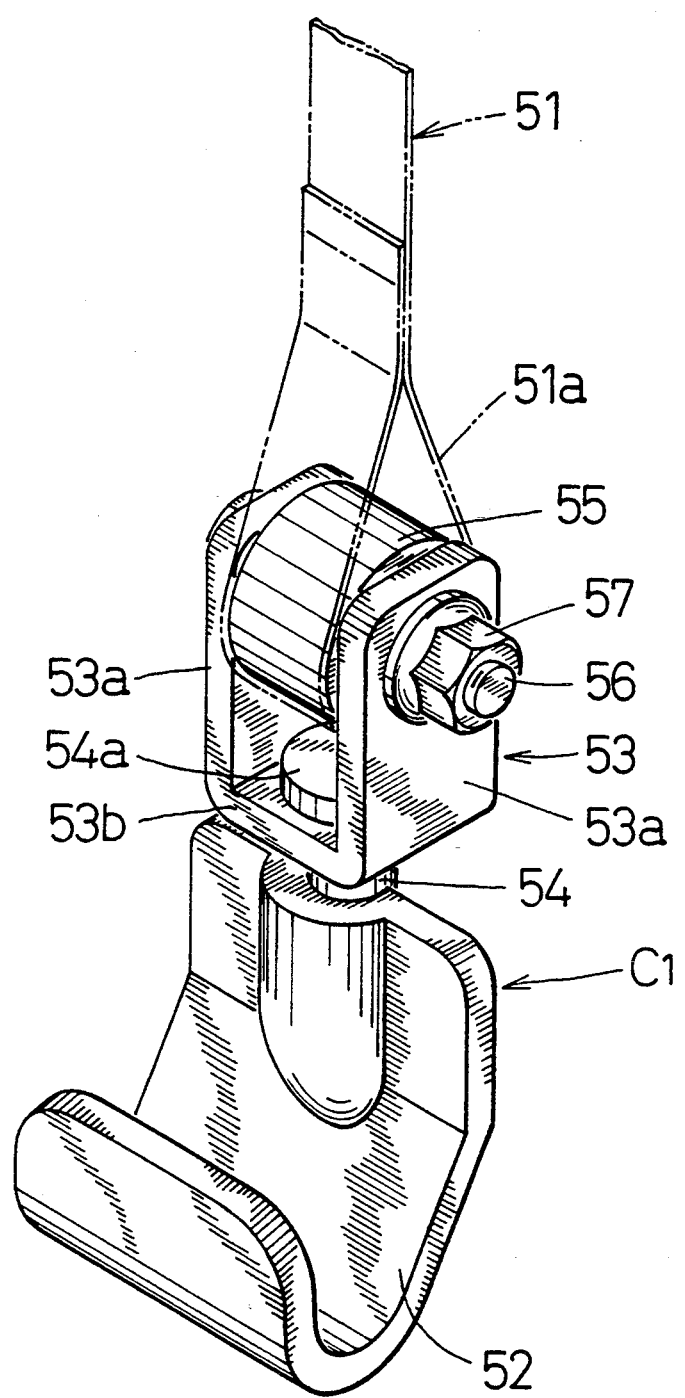
FIG. 13 is a perspective view showing a state in which a detachable end metal fitting $C_1$ according to a second embodiment of the invention is attached to one end of a belt main body 5.
Figure 14:
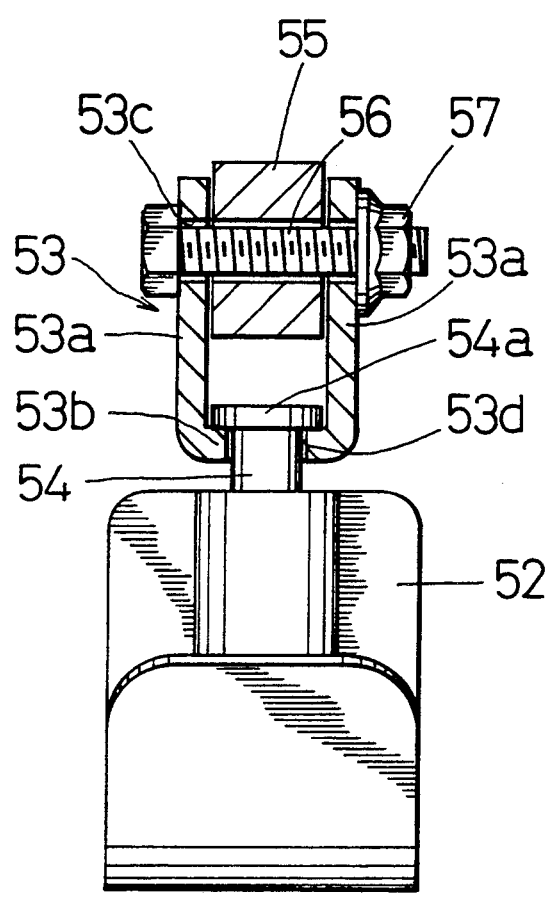
FIG. 14 is a front view, partially broken away, of the end metal fitting $C_1$ of FIG. 13.
Figure 15:
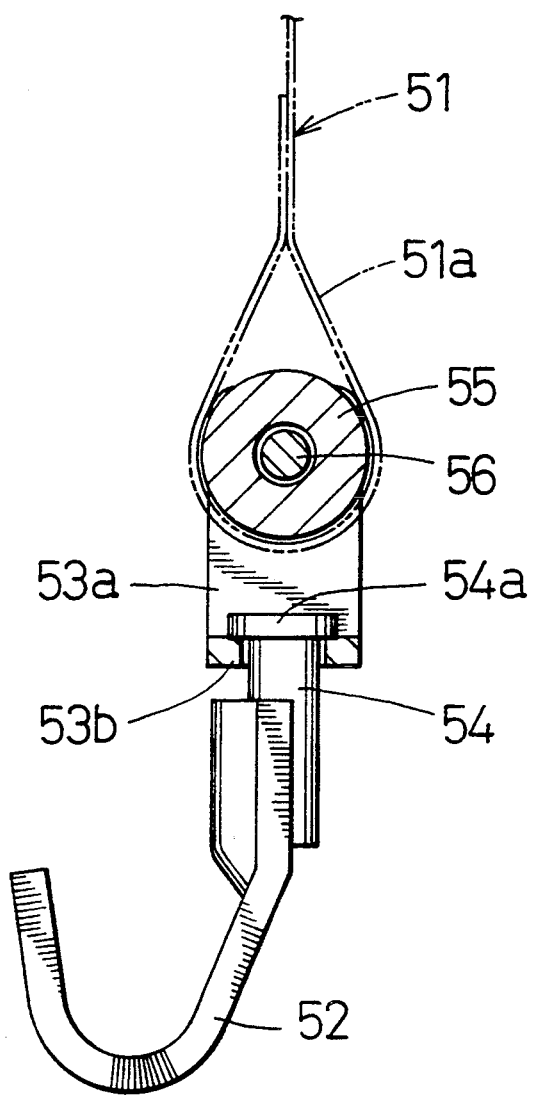
FIG. 15 is a side view, partially broken away, of the end metal fitting $C_1$ of FIG. 13.
Figure 16:
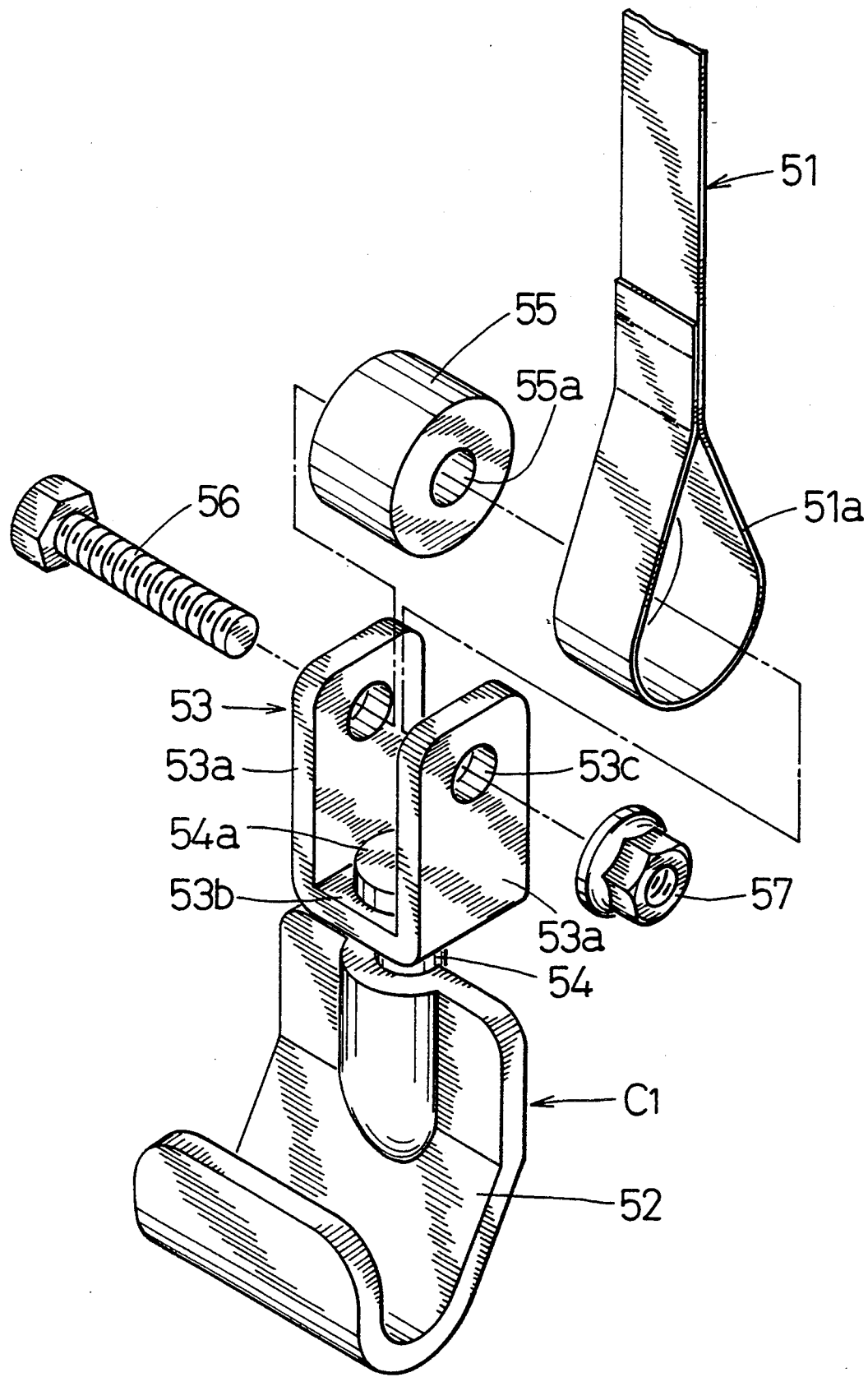
FIG. 16 is an exploded view of the end metal fitting $C_1$ of FIG. 13.

An end metal fitting $B_3$ of the first embodiment is shown in FIGS. 7 and 8. In this end metal fitting $B_3$, instead of the engaging plate 22 of the end metal fitting $B_1$, an engaging plate 41 formed by curving a thick sheet material like a hook is integrally attached to the metal fitting main body 21.

Either of these respective end metal fittings $B_2$ and $B_3$ is detachably attached to the metal fitting $A_1$ attached in turn to one end of the cargo fastening belt $V_1$, by using the slot 27 to be engaged formed in the upper end portion of the metal fitting main body 21. Thus, one cargo fastening belt $V_1$ can be used in con, non so as to obtain the same effect as that obtained when carrying cargo fastening belts of various types that are different from each other only because of different end metal fittings attached to ends thereof by producing and preparing detachable end metal fittings of various types in which engaging bodies of various configurations are integrally attached to metal fitting main bodies 21, each having a slot 27 in the upper end portion thereof for attachment to a metal fitting of a rail engaging type attached to one end of the fastening belt $V_1$.

In one construction of a cargo fastening belt, metal fittings of a rail engaging type are attached to both the ends thereof, while in the other construction an end metal fitting of a rail engaging type is attached only to one end thereof. The present invention may be applicable to both constructions.

Next, a second embodiment will be described. In FIGS. 13 to 17, an engaging body 52 is formed by curving a metal plate so as to form a fishhook-like cross-section. A shackle 53 is formed by bending a metal plate into a U-shape, and side plate portions 53a are connected to each other by means of a connecting plate portion 53b at the lower end thereof. A supporting bolt through hole 53c is formed in each of the side plate portions 53a for allowing a supporting bolt 56, which will be described later, to be put there through, while a suspension shaft through hole 53d (refer to FIG. 4) is formed in the connecting plate portion 53b for allowing a suspension shaft 54 secured by welding to a proximal end portion of the engaging body 52, to be put there through.

A jaw portion 54a is provided at the upper end of the suspension shaft 54. Most of the lower half portion of this suspension shaft 54 is secured by welding to the back side of the proximal end portion of the engaging body 52 in a state in which the suspension shaft 54 is put through the suspension shaft through hole 53d formed in the connecting plate portion 53b from above with the jaw portion 54a thereof being in engagement with the connecting plate portion 53b. Due to this, the engaging body 52 can be rotated relative to the shackle 53, and moreover is mounted so that it can slightly move vertically. Thus the engaging body 52 is mounted on the proximal end portion of the shackle 53 to thereby constitute an end metal fitting $C_1$.

A ring portion 51a is formed at the end of a belt main body 51. The outside diameter of a supporting roll 55 is dimensioned so that it fits into the ring portion 51a of the belt main body 51, and the length thereof is dimensioned so that the supporting roll may be inserted between the both side plate portions 53a with slight gaps being formed therebetween. A through hole 55a is formed at the center of the axis of the supporting roll for allowing a supporting bolt 56, which will be described later, to be put there through. In a state in which the supporting roll 55 is fitted into the ring portion 51a of the belt main body 51, this supporting roll 55 is inserted between both side plate portions 53a of the shackle 53, the supporting bolt 56 is inserted into the through hole 55a of this supporting roll 55 and the supporting bolt putting-through holes 53c formed in the both side plate portions 53 of the shackle 53, and a nut 57 is screwed over this supporting bolt 56 on the outside of one of the side plate portions 53a. This allows the supporting roll 55 to be rotatably supported at both side plate portions 53 of the shackle 53, and the end metal fitting $C_1$ is attached to the ring portion 51a of the belt main body 51 via the supporting bolt 56 and roll 55. In order to remove the end metal fitting $C_1$ from the ring portion 51a of the belt main body 51, the supporting bolt 56 only has to be pulled out of the shackle 53 after release of the threaded engagement between the supporting bolt 56 and nut 57.

Figure 17:
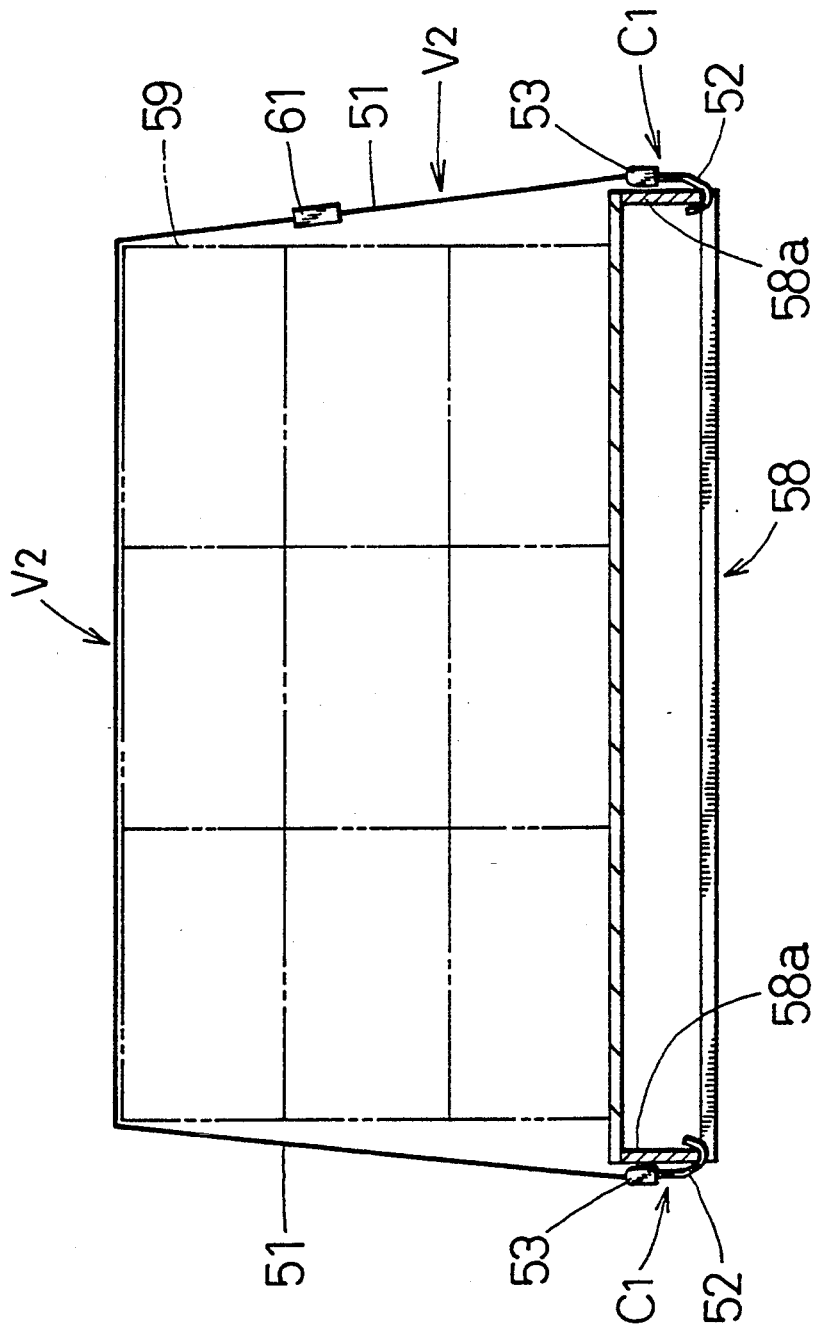
FIG. 17 is drawing showing a state in which cargoes 59 are fastened onto a wood pallet 58 by means of a cargo fastening belt $V_2$ employing the end metal fitting $C_1$.

FIG. 17 shows a state in which cargoes 59 loaded on a wood pallet 58 are fastened by using cargo fastening belts $V_2$. Namely, two belt main bodies 51 are connected to each other via a cargo fastening machine 61, and the afore-said end metal fittings $C_1$ are attached to ends of the two belt main bodies 51, respectively. When the engaging bodies 52 of the respective end metal fittings $C_1$ are hooked at side plates 58a of the wood pallet 58, thereafter allowing the fastening machine 61 to pull in the belt main bodies 51 by predetermined lengths, the cargoes 59 are fastened to the wood pallet 58 by means of the cargo fastening belt $V_2$.

Figure 18:
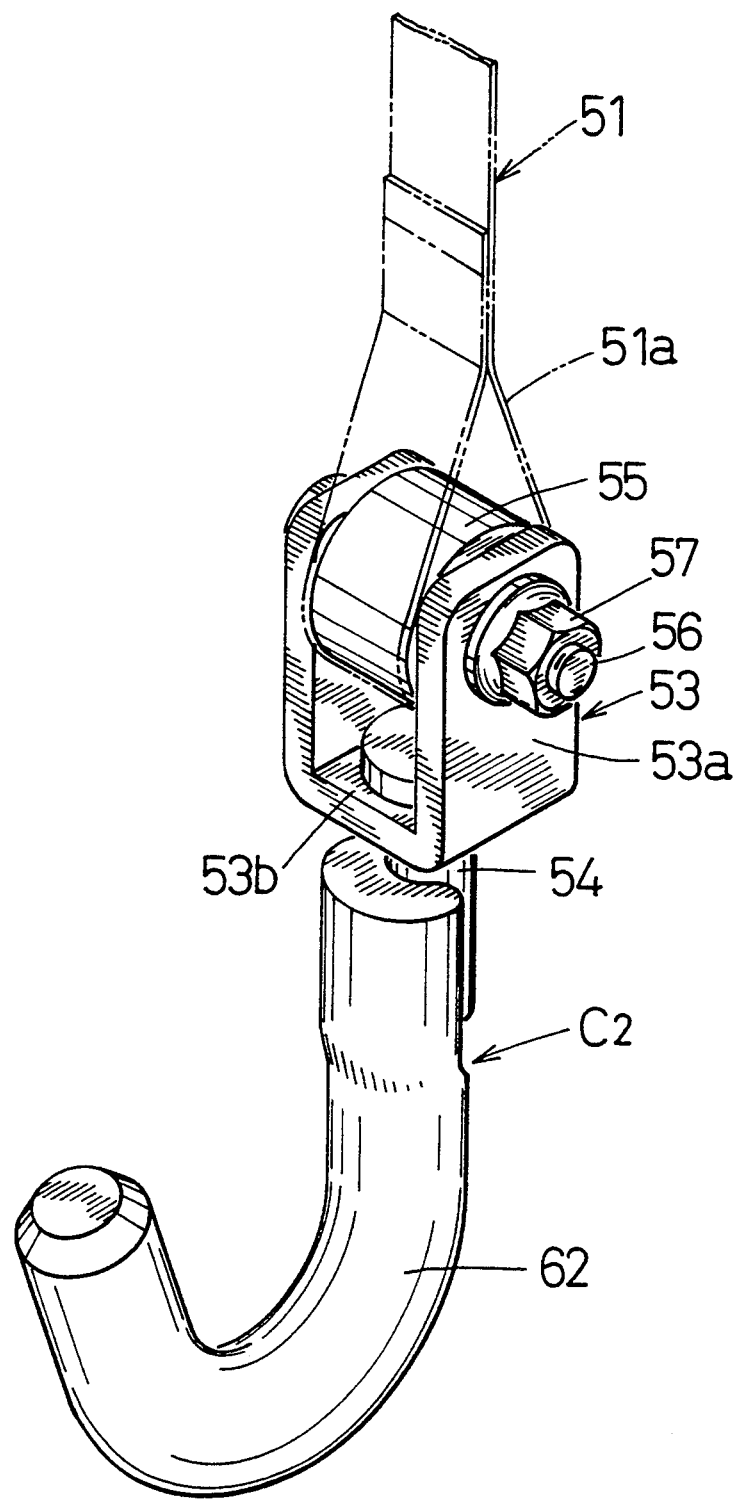
FIG. 18 is a perspective view of a detachable end metal fitting $C_2$ according to the second embodiment of the invention.
Figure 19:
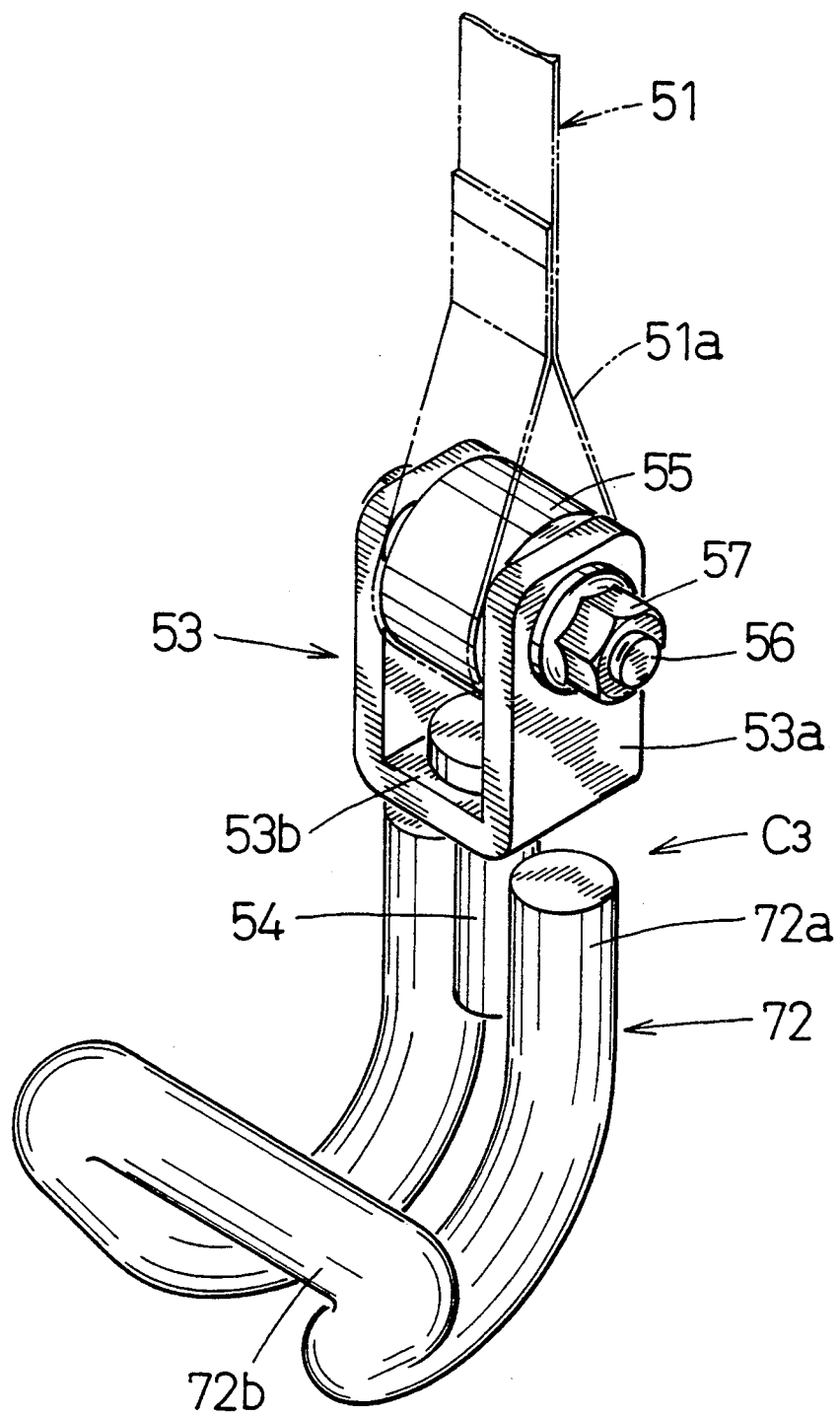
FIG. 19 is a perspective view of a detachable end metal fitting $C_3$ according to the second embodiment of the invention.

In the construction of an end metal fitting $C_2$ shown in FIG. 18, the shackle 53 is attached to a proximal end portion of an engaging body 62 formed by curving one thick rod member in a hook-like fashion via the suspension shaft 54. In the construction of an end metal fitting $C_3$ shown in FIG. 19, one rod member is bent so as to constitute a proximal end portion 72a of an engaging body 72 at the ends of the rod member so bent, and the suspension shaft 54 is inserted to be held therebetween and secured thereat by welding, while a distal end portion 72b of the engaging body 72 is constituted by the central portion of the rod member. There is a portion at the distal end portion 72b where the rod member becomes horizontal, and the shackle 53 is mounted on the proximal end portion of this engaging body 72 via the suspension shaft 54.

In the respective end metal fittings $C_1$ and $C_2$, $C_3$ of the afore-said types, if the shackle 53 that is to be attached to the proximal end portion of the respective engaging bodies 52, 62 and 72 is kept in the same configuration, the respective end metal fittings $C_1$, $C_2$ and $C_3$ of these types can be detachably attached to the ring portion 51a of the belt main body 51 via the supporting roll 55 and supporting bolt 56, and thus the belt main body 51 can be used in common.

In addition, in the above embodiments, since the diameter of the supporting bolt 56 is small at the portion thereof for supporting the belt main body 51, the supporting roll 55 is used in order to increase the diameter of the supporting bolt 56 at such a portion, and therefore, in a case where the supporting portion of the supporting bolt 56 has a diameter sufficiently large for supporting the belt main body 51, there is no need to use the supporting roll 55.

I claim:

1. An apparatus comprising:
   a rail engaging metal fitting attached to one end of a cargo fastening belt, said rail engaging metal fitting being adapted to detachably engage a slot in a rail for fastening cargo; and
   a detachable end metal fitting detachably attached to said rail engaging metal fitting, said detachable end metal fitting comprising a metal fitting main body and an engaging portion integral with said metal fitting main body for engaging a mating member when fastening cargo;
   wherein said metal fitting main body of said detachable end metal fitting has a slot formed therein and said rail engaging metal fitting is detachably engaged with said slot of said metal fitting main body;
   wherein said rail engaging metal fitting has a main body that is substantially U-shaped in cross-section; and
   wherein an engaging lever is disposed inside and pivotally mounted on said main body, said engaging lever having a spring biasing said engaging lever to a position wherein, when said rail engaging metal fitting is engaged with said slot, said rail engaging metal fitting is prevented from being removed from said slot.

2. The apparatus of claim 1, wherein said main body of said rail engaging metal fitting has opposite engaging grooves enabling said rail engaging metal fitting to be inserted in said slot, and said engaging lever at least partially covers one said engaging groove in said position.

3. The apparatus of claim 1, wherein said metal fitting main body has opposite facing side plate portions having said engaging portion connected thereto and an upper end portion having said slot therein.

4. The apparatus of claim 3, wherein said engaging portion is connected to said opposite facing side plate portions therebetween.

5. An apparatus, comprising:
   a rail engaging metal fitting attached to one end of a cargo fastening belt, said rail engaging metal fitting having an engagement means for detachably engaging a slot in a rial for fastening cargo; and
   a detachable end metal fitting comprising a metal fitting main body and an engaging portion integral with said metal fitting main body for engaging a mating member when fastening cargo, said metal fitting main body of said detachable end metal fitting having a slot formed therein;
   wherein said engagement means of said rail engaging metal fitting is detachably attachable to said detachable end metal fitting through detachable engagement with said slot thereof;
   wherein said rail engaging metal fitting has a main body that is substantially U-shaped in cross-section; and
   wherein said engagement means comprises an engaging lever disposed inside and pivotally mounted on said main body, said engaging lever having a spring biasing said engaging lever to a position wherein, when said rail engaging metal fitting is engaged with said slot, said rail engaging metal fitting is prevented from being removed from said slot.

6. The apparatus of claim 5, wherein said main body of said rail engaging metal fitting has opposite engaging grooves enabling said rail engaging metal fitting to be inserted in said slot, and said engaging lever at lest partially covers one said engaging groove in said position.

7. The apparatus of claim 5, wherein said metal fitting main body has opposite facing side plate portions having said engaging portion connected thereto and an upper end portion having said slot therein.

8. The apparatus of claim 7, wherein said engaging portion is connected to said opposite facing side plate portions therebetween.

* * * * *